(12) United States Patent
Morita

(10) Patent No.: US 6,814,897 B2
(45) Date of Patent: Nov. 9, 2004

(54) METHOD FOR MANUFACTURING A MOLDING TOOL USED FOR SUBSTRATE MOLDING

(75) Inventor: Seiji Morita, Yokohama (JP)

(73) Assignee: Discovision Associates, Irvine, CA (US)

( * ) Notice: Subject to any disclaimer, the term of this patent is extended or adjusted under 35 U.S.C. 154(b) by 501 days.

(21) Appl. No.: 09/729,317

(22) Filed: Dec. 5, 2000

(65) Prior Publication Data

US 2001/0003384 A1 Jun. 14, 2001

Related U.S. Application Data

(63) Continuation-in-part of application No. 09/277,188, filed on Mar. 26, 1999.

(30) Foreign Application Priority Data

Mar. 27, 1998 (JP) .......................................... 10-080624

(51) Int. Cl.[7] .............................................. B29D 11/00
(52) U.S. Cl. ...................... 264/1.33; 264/1.37; 264/2.5; 425/810
(58) Field of Search ............................... 264/1.33, 2.5, 264/1.37, 106, 107; 425/810; 205/70

(56) References Cited

U.S. PATENT DOCUMENTS

| | | | |
|---|---|---|---|
| 4,211,617 A | 7/1980 | Hunyar | 204/5 |
| 5,494,782 A | 2/1996 | Maenza | 430/321 |
| 5,673,250 A | 9/1997 | Mieda et al. | 369/275.4 |
| 5,741,627 A | 4/1998 | Cubit | 430/321 |
| 6,068,906 A | 5/2000 | Sasa | 428/64.2 |

FOREIGN PATENT DOCUMENTS

| | | |
|---|---|---|
| JP | 61-3382 | 1/1986 |
| JP | 61-248250 | * 11/1986 |
| JP | 63-177329 | 7/1988 |
| JP | 5-205321 | 8/1993 |
| JP | 5-339774 | 12/1993 |
| JP | 8-180475 | 7/1996 |
| JP | 11-333856 | 12/1999 |

* cited by examiner

Primary Examiner—Mathieu D. Vargot
(74) Attorney, Agent, or Firm—Keiji Masaki; Steve Wong; Caroline Do

(57) ABSTRACT

The invention relates to methods for making mold tools. More particularly, the mold tools are used for molding a resin substrate which has fine pits, i.e., concavities and protuberances. The invention also pertains to a method for manufacturing a resin substrate. Such resin substrates may be used as an optical disk, a magnetic disk, a hard disk, etc., for recording data. According to a preferred embodiment of the invention, a first metallic (Ni) mold tool (father) is made which is a duplicate of a master substrate, then a resin mold tool (mother) is made which is a duplicate of the first metallic mold tool and finally a second metallic (Ni) mold tool (son) is made which is a duplicate of the resin mold tool. Both the father and son may be referred to a "stamper". The invention also relates to methods of manufacturing a mold tool for molding the base of an optical disk having at least one signal recording region and at least one non-signal recording region. The invention also relates to stampers used to make optical disks which have a signal recording region and a non-signal recording region.

11 Claims, 4 Drawing Sheets

METHOD FOR MANUFACTURING A MOLDING TOOL USED FOR SUBSTRATE MOLDING

This application is a continuation-in-part of U.S. patent application Ser. No. 09/277,188, filed Mar. 26, 1999, now U.S. Pat. No. 6,207,247 herein incorporated by reference in its entirety. That application claims benefit under 35 U.S.C. §119 of Japanese Patent Application No. 10-080624, filed on Mar. 27, 1998.

FIELD OF THE INVENTION

The invention relates to methods for making molding tools. More particularly, the molding tools are used for molding a resin substrate which has fine pits, i.e., concavities and protuberances and to a method for manufacturing a resin substrate. Such resin substrates may be used as an optical disk, a magnetic disk, a hard disk, etc., for recording data.

It is an object of this invention to identify a son stamper and an optical disk that have been manufactured using that son stamper and a particular master substrate.

BACKGROUND OF THE INVENTION

Data recording media such as optical disks, hard disks, etc., are capable of recording large quantities of information. Such data recording media are commonly referred to as CD's (compact disks), LD's (laser disks), DVD's (digital video disks, digital versatile disks), etc. These data recording media may contain music, movies, software, etc. Such media are also used as storage devices in computers. Demand for such recording media is expanding greatly. Indeed, it is anticipated that optical disk and hard disk usage will continue to expand since these are the major recording media of the multimedia age.

Optical disks are classified according to the existence or absence of a recording layer and further classified according to the type of recording layer. Optical disk types include: (1) the read-only type (CD, LD, CD-ROM, photo-CD, DVD-ROM, read-only type MD, etc.); (2) the write-once type (CD-R, DVD-R, DVD-WO, etc.); and (3) the rewriteable type capable of erasure followed by writing any number of times (magneto-optical disk, phase-change type disk, MD, CD-E, DVD-RAM, DVD-RW, etc.). Moreover, the high density HD-DVD has also been proposed as a medium of the future.

The process for manufacturing these optical disks begins with the molding of raw material resin into a resin substrate. Raw material resin, for example, polycarbonate, acrylate resin, polystyrene, etc., is heated, melted or partially melted, and then pressed using a stamper, thereby molding (manufacturing) a resin substrate. Typically, the molding method used is a pressure molding or injection molding method. The stamper forms fine concavities and protuberances which represent the information to be copied upon the substrate surface. Other than resin molding, there is no such method for manufacturing large quantities of substrates that have minute concavities and protuberances in a short time period.

Types of pits and protuberances include pits that indicate a unit of information and guide grooves that are provided for tracking by the pickup head. Generally, the manufacture of data recording media involves circular substrates provided with pits and grooves on the substrate surface in a pattern of concentric circular rings or as a spiral pattern. The region between grooves along the radial direction is called a "land."

Recording upon the lands occurs during the land recording method, or alternatively, recording occurs within the groove per the groove recording method.

In order to improve the recording density, the land/groove recording method was developed to record upon both the grooves and lands. In this case, both grooves and lands are tracks, and the width of both grooves and lands are nearly equal. However, there are reasons for sometimes deliberately widening one or the other. For example, when incident light enters the backside surface (flat smooth surface) of the substrate, what appears as a land from the substrate interior side becomes a groove as seen from the substrate front.

As the recording density has increased, to meet the increased need for storage capacity, the width of grooves, lands, and pits has decreased and their depth has increased. For example, the width has decreased from <1 $\mu$m to <0.3 $\mu$m and the depth has increased from >40 nm to >250 nm. As the width decreases and the depth increases (i.e., as density become higher), molding of the resin substrate becomes increasingly difficult, and the yield of good product declines.

When manufacturing a hard disk, a magnetic recording layer is typically formed or deposited on an aluminum or glass substrate with recording carried out by a magnetic head. A reflection layer, a recording layer and a protection layer may then be formed on the resin substrate to produce the desired final product.

As recording density increases, the recording layer becomes extremely flat and smooth. When the magnetic head becomes relatively still, the recording head and the recording layer adhere to one other and then fail to separate. In order to avoid this phenomenon, a garage region (CSS region=contact stop and start) is provided. The surface of this garage region is deliberately finished with a rough texture using a laser such that surface adherence is prevented. Head tracking also becomes difficult as recording density increases. Therefore it is proposed that a magnetic hard disk, like an optical disk, should be provided with grooves. Due to the demand for such roughness and grooves, resin substrates are proposed as a means to increase manufacturing productivity. Increased productivity results due to the formation of roughness and grooves during the substrate molding. Resin substrates are also said to be advantageous due to their light weight.

Previously, molding tools were manufactured by the process described in Hunyar, U.S. Pat. No. 4,211,617, which corresponds to Japanese Publication Koukoku Sho 59-16332, the disclosures of which are incorporated by reference herein in their entirety. A comparison of the method of forming the molding tool as disclosed in Hunyar and that of the present invention is provided in FIGS. 3A (present invention) and 3B (Hunyar).

Generally, molding tools are manufactured using a glass substrate that is polished with the precision of an optical surface. After the substrate 1 is cleaned it is coated with a primer, for example, a silane coupling agent. A photoresist is then applied by spin coating and subjected to a pre-bake process. Positive-type, i.e., wherein the region exposed to light is removed during development, photoresist 2 is often used (see item (B1) in FIG. 3). Next, a laser beam recorder or a laser cutting machine is used to expose the photoresist 2 with a pattern of pits and/or grooves where the width of pits and grooves is generally determined by the laser beam diameter and the depth of the pits and grooves is generally determined by the photoresist thickness. When the exposed photoresist is developed, a resist pattern of pits and/or grooves is obtained upon the substrate surface. Following development, the resist pattern may optionally undergo a 20–60 minute post-bake at 80–120° C. When such a post-bake is used, the resist pattern is then cooled down to room temperature. Roughly 10 hours are required to cool the resist pattern. The resist pattern formed in this manner is referred to as a "master substrate" or a "master" and is indicated by item (B2) in FIG. 3 of the present application. It is also shown in FIG. 4, reference number 46, of Hunyar U.S. Pat. No. 4,211,617. In addition to the fact that these master substrates require long production times, the laser beam recorder or a laser cutting machine used to expose the photoresist is very expensive. As a result, master substrates are expensive and time-consuming to produce.

The master substrate then undergoes metallization treatment to form a conductive layer on the surface. Generally such treatment is carried out by sputtering (dry-type method), or by non-electrolytic plating (wet-type method). Following metallization, a thick plating layer, such as nickel (Ni), is formed upon the master substrate. The result is a first metallic molding tool that has a double layer structure that consists of a conductive layer and the Ni plating layer. This is shown by item (B3) of FIG. 3 of the present application. This first metallic molding tool is referred to herein as the "father," 3. A free father is obtained when the father 3 is peeled from the master substrate resist pattern. This is indicated by item (B4) of FIG. 3. The father is equivalent to mother member 52 in FIG. 6 of Hunyar U.S. Pat. No. 4,211,617. Care must be used during peeling since the father is generally thin, approximately 200–300 $\mu$m in thickness. After peeling, the father 3 undergoes solvent treatment to remove resist since a portion of the resist may remain on the father 3. Resist must be removed since the concavities and protuberances on the surface of the father would otherwise be destroyed. Only a single father 3 is obtained from a single master substrate since the resist pattern is damaged during peeling. After the resist is removed, the concavity-protuberance surface is shielded with a protective coat and the backside surface is polished. A central hole is bored in the center of the father 3, and the unused portion of the outside perimeter is cut off. This results in an annulus-shaped father.

The father that is completed in this manner has an extremely accurate pattern of concavities-protuberances. Without additional treatment, the father may be used as an injection mold to make resin substrates for use as DVD-RAM, MD, HD-DVD, and other high density recording media (<0.8 $\mu$m groove width) that require an extremely high-precision pattern of concavities-protuberances.

However, the father is very expensive due to the high cost of the master substrate and the fact that only a single father is obtained from a single master substrate. Therefore a duplicate of the father is obtained in the same manner using Ni electrotype duplication. This is shown by item (B5) in FIG. 3. This duplicate molding tool is referred to herein as a "mother," 4b. A free mother is obtained when the mother 4b is peeled from the father 3. This mother 4b is equivalent to sub-master 60 in FIG. 8 of U.S. Pat. No. 4,211,617. Prior to electrotype duplication, the mother 4b undergoes surface treatment (passivation) so that the mother will readily peel away from the father 3. A typical surface treatment uses potassium dichromate solution, potassium permanganate solution, etc. It is not possible to reuse the father indefinitely since the father may become somewhat damaged when the mother is peeled away from the father. Generally, a maximum of 2 or 3 uses is possible. Therefore only 2 or 3 mothers can be obtained from a single father. The mother can also be used as a molding tool for injection molding but the concavities and protuberances of the mother are opposite those of the father.

To further increase the number of copies or to reverse the concavities-protuberances, the mother 4b may be used in place of a master substrate, and a duplicate of the mother 4b is obtained in the same manner using Ni electrotype duplication. This is shown by item (B7) in FIG. 3. This duplicate of the mother is referred to herein as the "son," 6. A free son is obtained when the son is peeled from the mother 4b. This is shown by item (B8) in FIG. 3. The son 6 is equivalent to the stamper member 70 in FIG. 9 of Hunyar U.S. Pat. No. 4,211,617. In order to readily peel the son 6 from the mother 4b, the mother 4b also undergoes passivation prior to electrotype duplication. Since the mother 4b is also somewhat damaged when the son 6 is peeled away from the mother 4b, it is not possible to reuse the mother indefinitely. Typically, a maximum of 2 or 3 uses is possible. Therefore only 2 or 3 sons can be obtained from a single mother 4b.

Due to the damage of the father and mother molding tools, it is typical to form only about 4–9 sons from a single high-cost father. Typically, the son (or possibly the father or mother) is used during injection molding to mold a large number of resin substrates. These substrates are used for data recording media such as optical disks, hard disks, etc. Roughly 20,0000–30,000 resin substrates can be molded from a single son. However, the son itself becomes damaged and unusable after the molding of more than about 20,000–30,000 substrates. Resin substrate quality would decline if the son were to be used further.

Typically, when an extremely high precision concavity-protuberance pattern is required, the father itself is utilized as the mold. However, this results in high cost (problem A). In order to reduce costs, duplicate sons are used as the mold, but these are still expensive since the number of such duplicates which can be accurately produced is low, e.g., about 4–9. Therefore sons are still expensive (problem B). Additionally, volume production using the prior art methods is also difficult (problem C).

It has also been proposed to reduce prices by manufacturing a large number of mothers from a single father, and to manufacture a large number of sons from each mother. However, when this is done, the resultant mothers and sons are not highly precise (problem D). Consequently numerous identical fathers are required. However, for various reasons, minute differences (problem E) occur between fathers when numerous fathers are manufactured. These minute differences are referred to here as "individuality." Due to such individuality, the injection molding conditions, for example, mold temperature and injection pressure, must be carefully adjusted after a father is replaced. Adjustments must be made to the molding conditions used from mother-to-mother or son-to-son. Individuality is quite problematic for manufacturers using injection molding since substrate productivity declines during the adjustment time period (problem F).

Consequently, there is a need in the art for a process which enables the production of low cost, high volume, high precision molding tools.

SUMMARY OF THE INVENTION

The invention answers the problems connected with the previous mold tool manufacturing processes. More specifically, the invention provides a method for manufacturing a son that can be used for molding a resin substrate, wherein a resin is used instead of a metal plating layer to form the mother. Generally, the method for making the resin mold tool (mother) involves forming a resin layer on a first metallic mold having at least one surface containing minute concavities and protuberances; hardening or curing the resin layer to form a hardened or cured resin layer; and, peeling the cured resin layer from the first metallic mold to form a resin mold tool having a surface containing minute concavities and protuberances corresponding to those on the surface of the first metallic mold.

The invention is further directed to a method for manufacturing a data storage medium resin substrate wherein the son manufactured by the methods of the present invention, is used to mold raw material resin to manufacture the data storage medium resin substrate.

The invention is further directed to the second metallic molding tool (the son) produced by the method of the present invention, which has a surface roughness (Ra) less than or equal to 10 nm, preferably less than about 1 nm.

The invention is also directed to a resin substrate having a diameter of about 50 mm to about 130 mm and a surface waviness of about 1 nm or less.

One aspect of this invention relates to a method of manufacturing a mold tool for molding the base of an optical disk having at least one signal recording region and at least one non-signal recording region. The method entails (a) providing a master substrate having a signal recording region which contains at least one minute concave or convex section, and a non-signal recording region which contains at least one concave or convex section forming a mark indicating the master substrate as the master substrate; (b) forming a first nickel or nickel-alloy mold on a master substrate; (c) peeling off the master substrate from the first mold; (d) forming a resin layer in the first mold; (e) hardening the resin layer to form a cured resin mold; (f) peeling off the first mold from the resin mold; (g) forming a second nickel or nickel-alloy mold on the resin mold; (h) peeling off the second mold from the resin mold; and (i) marking the non-signal recording region of the second mold, indicating the second as the second mold. The second mold has a signal recording region having at least one minute concave or convex section, and a non-signal recording region having at least one concave or convex section forming a mark that indicates the second mold as the second mold.

Another aspect of this invention relates to a method of manufacturing a mold tool for molding a substrate. The method entails (a) providing a master substrate having a signal recording region which contains at least one concave or convex section, and a non-signal recording region which contains at least one concave or convex section forming a mark that indicates the master substrate as the master substrate; (b) duplicating the master substrate and forming a mold tool; and (c) forming a concave or convex section in the non-signal recording region of the mold tool which indicates that the mold tool is the mold tool. In this method, a resist is applied to the base of the master substrate and exposed using a laser cutting device to form a mark in the non-signal recording section of the master substrate.

Another aspect of this invention relates to a stamper for making optical disks which have a signal recording region and a non-signal recording region. The stamper contains at least two marks in the non-signal recording region of the stamper. The first mark identifies the master substrate as the master substrate of the stamper and the second mark identifies the stamper as the stamper.

DETAILED DESCRIPTION OF THE INVENTION

The invention relates to methods for making molding tools and methods for making data storage resin substrates. Generally, the data storage resin substrates of the invention may be manufactured from the second metallic molding tool ("son", which is also known by the term "stamper"). As described in more detail below, two major classifications of master substrate are made, master substrate I and master substrate II. Both of these types are sometimes referred to by the generic term "master substrate." The master substrate contains a surface having fine pits and protuberances which may be formed by coating the substrate with a photoresist and exposing a predetermined pattern on the photoresist using a laser. This type of substrate is referred to master substrate I. Master substrate II is made by etching the exposed portions of master substrate I to form concavities corresponding to the pits and grooves.

Figure 3:
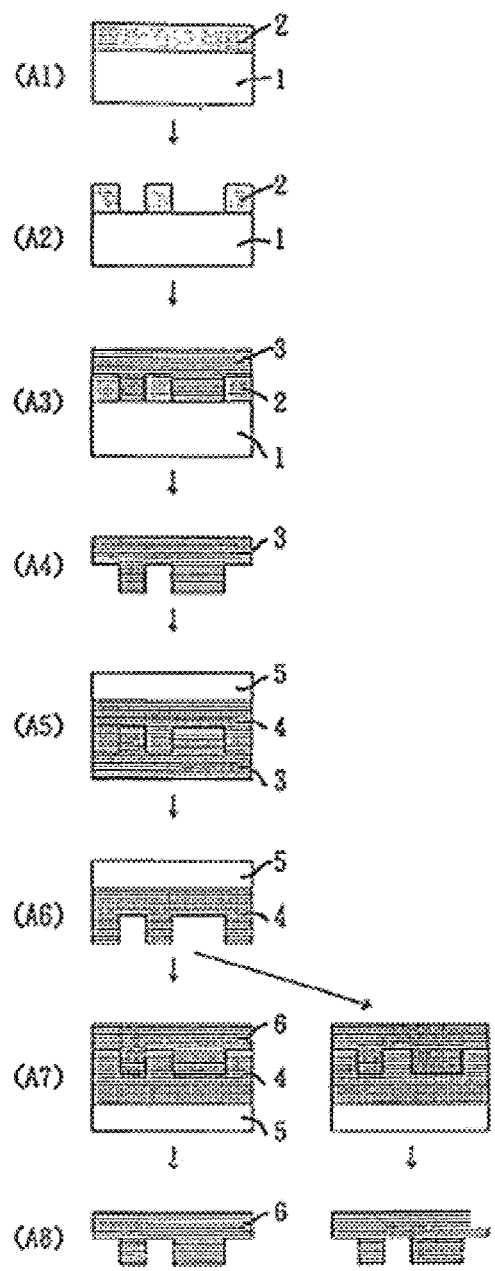
FIG. 3 is a process flow diagram depicting the a manufacturing process of the invention compared to a prior art process.
Figure 3:
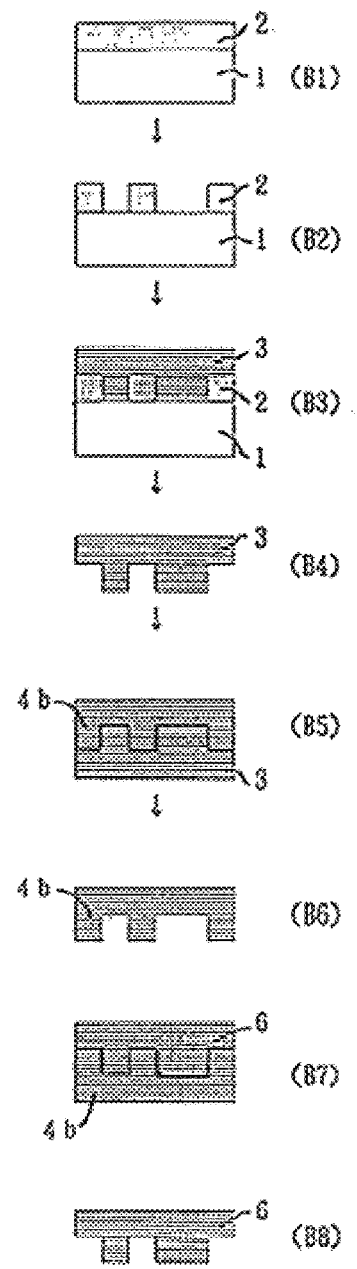

Generally, as depicted in FIG. 3A, master substrates 1 of the invention may be plated with a metal layer 2 to make a first metallic mold tool ("father," 3) which is a duplicate of the master substrate I. The father 3 may then be used as a substrate upon which a resin mold tool ("mother", 4) is formed. A glass plate 5 may be placed on the resin mold tool 4 in order to avoid the introduction of bubbles into the resin mold tool 4. This mother may itself may then be plated with a metal layer to make one or more second metallic mold tools ("son," 6) which are duplicates of the mother. Typically the son 6 is employed as a stamper to produce molded resin substrates such as those used as data storage media. In a preferred embodiment of the invention, the first and second metallic mold tools are made of nickel.

Master Substrate I

First, the substrate is prepared. Although the substrate is usually disk shaped, it is possible for the substrate to be polygonal, not limited to a disk shape. Examples of the substrate material mainly include glass materials. Suitable glass materials include, but are not limited to soda lime glass (green plate glass), aluminosilicate glass (white plate glass), alkali-free glass, low-expansion glass, crystalline glass and ceramic materials. Quartz, for example, fused quartz or synthetic quartz, or even Si can be used as the ceramic material. Additionally, if desired, it is possible to use a metal substrate material, such as, Al, Fe, Cu, etc.

To prepare the master substrate, the substrate surface is precisely polished in order to obtain a highly precise surface that is flat and smooth. It is also permissible to form a surface layer upon the substrate surface. Examples of suitable surface layer materials include, but are not limited to, (1) silicon oxide compounds, such as $SiO_2$; (2) silicon-nitrogen compounds, such as $Si_3N_4$; (3) metal silicide compounds, such as $TiSi_2$; or (4) metals, such as Ti, Al, Cu, Cr, TA, Au, Ag, Pt, etc.; and (5) metal oxides or metal nitrides, such as $TiO_2$, TiN, $Al_2O_3$, AlN, $TaO_2$, $Ta_2O_3$, $Ta_3N_4$, etc. Furthermore, it is also possible to form the surface layer by oxidation or nitration of the substrate surface. In many cases, the surface layer is formed by thin layer deposition technology, for example, vacuum deposition or sputtering. It is also possible in such cases to form layers of two or more such materials. It is also possible to utilize precision polishing, such as chemical mechanical polishing, etc., to improve the smoothness and flatness of the surface layer.

Having polished the substrate surface, the surface is coated with a photoresist. A photoresist may be applied by spin coating. Usually, a primer, such as a silane coupling agent coating, is applied to the substrate prior to photoresist coating. This primer improves adhesion of the photoresist to the substrate. Yet, there are instances when a primer is not needed, such as when Cr, TiN, etc., exist in the surface layer. In general, the photoresist depth determines the depth of pits and grooves.

As the recording density of storage media has increased, the width of the grooves, lands, and pits has decreased whereas the depth has increased. Generally, the width has decreased, for example, from <1 $\mu$m to <0.8 $\mu$m to <0.7 $\mu$m to <0.6 $\mu$m to <0.5 $\mu$m to <0.4 $\mu$m to <0.3 $\mu$m and the depth has increased, for example, from >40 nm to >50 nm to >80 nm to >100 nm to >120 nm to >130 nm to >150 nm to >180 nm to >200 nm to >250 nm. In general, the width of the grooves, lands and pits is from about 2 $\mu$m to about 0.02 $\mu$m and their depth is from about 10 nm to about 1 $\mu$m.

After having applied a photoresist coating, a low temperature pre-bake may be carried out to adjust resist sensitivity. Subsequently, a laser beam recorder is used to illuminate the resist according to a prescribed pattern of pits, grooves, etc. The resist is exposed in this manner.

The exposed resist is immersed in developing solution, and the resist is developed. Examples of the developing solution include, but are not limited to, solutions of inorganic alkaline compounds such as sodium phosphate, calcium phosphate, sodium hydroxide, calcium hydroxide, etc. It is also possible to use an organic, rather than inorganic, alkaline solution. When a positive type photoresist is used, the exposed portion dissolves in the developing solution. When a negative type photoresist is used, the unexposed portion dissolves in the developing solution. Having dissolved the photoresist, resist is washed with ultrapure water and the underlying substrate is exposed within the dissolved portions. A substrate obtained in this manner that has a photoresist pattern on its surface. This type of photoresist pattern, together with the substrate, is referred to as the "resist pattern." Such a resist pattern is referred to as master substrate I.

After development, it is possible to heat the master substrate to a somewhat high temperature during a post-bake. A post-bake is sometimes used to increase the sidewall angles of grooves and pits. Post-baking can also be used to improve resistance of the resist to etching, to improve adhesion between the resist and the substrate and also to harden the resist surface. By increasing the resist's hardness, the resist is able to endure subsequent processes, including metallization and the formation of a plating layer upon the conductive layer by the electrotype method. When the second metallic molding tool (son) is used for injection molding of the resin substrate, duplication characteristics and mold releasability can depend upon a variety of factors, including whether the groove and pit sidewall angles are tilted and whether the sidewalls have rounded morphology.

Master Substrate II

First, the master substrate I (resist pattern) is prepared. Since the substrate is exposed within a portion of this resist, the exposed region is etched so as to provide a concave region upon the substrate. This concave pattern is identical to the resist pattern. The dry process is preferred for etching although it is also possible to utilize the wet process. Among dry processes, the reactive ion etching (RIE) method is particularly advantageous. Other etching processes that can be used include, but are not limited to, etching utilizing magnetron RIE, electron cyclotron resonance (ECR), induction-coupled plasma (ICP), helicon waves, etc. It is possible to use the RIE method using a normal low plasma density process (less than $10^{10}$ ions/cm$^3$). However, a high plasma density process (greater than $10^{11}$ ions/cm$^3$) is preferred in order to reduce etching region surface roughness and sidewall surface roughness. The latter includes RIE utilizing ICP or helicon waves which are advantageous for use with particularly fine patterns.

When dry etching is used, it is possible to form sharp sidewall angles within a front edge and a rear edge of a pit, with a preferred sidewall angle of 90°. This is carried out to reduce reproduction signal jitter of the optical disk. When a ceramic mold (master substrate II) is used, the pit and groove sidewalls are not as rough as those of the resist pattern (master substrate I). If dry etching is used, the concavity bottom surfaces and the sidewall surfaces have extremely low surface roughness after etching. Various etching methods, not limited to dry processes, can form rather deep concavities with sharp sidewall angles. A deep concavity and a steep concavity sidewall angle can impart various types of benefits to an optical disk. These benefits include reduction of noise, lowering of optical crosstalk between adjacent tracks, and reduction of thermal crosstalk (cross erasure).

When a substrate is used that has a surface layer, it is possible to just etch the surface layer. If the surface layer material and the underlying substrate material etch at different rates, etching a substrate that has a surface layer is advantageous since it becomes possible to carry out etching uniformly. When etching such a substrate and surface layer, the surface layer thickness determines the depth of the grooves, etc.

Typically, the remnant resist is removed after the etching process. Removal may be carried out by a dry etching process (ashing) using oxygen plasma. Alternatively, the remnant resist is removed by immersion in a heated container holding a concentrated acidic solution such as concentrated sulfuric acid or concentrated nitric acid. Addition of hydrogen peroxide to such a solution improves resist removal. After resist is removed in this manner, the substrate surface is washed, for example, with ultrapure water.

In this manner, a substrate is obtained that has concavities corresponding to the pits and grooves. This substrate is master substrate II. Ceramic material is particularly preferred as a material of construction of this substrate. Ceramic material is preferred since the ceramic surface is quite smooth. In other words, ceramic material surface roughness (Ra) is extremely low, e.g. <10 nm. Roughness (Ra) may be measured by conventional means, such as with a TOPO-SYSTEM, manufactured by Wyko, Corp. Optical disk noise is reduced when such a ceramic material is used for the manufacture of optical disks. Therefore the superiority of ceramic material is acknowledged by calling a master substrate II a "ceramic mold."

First Metallic Molding Tool (Father)

The father is manufactured by plating the master substrate disk using either a thick or a thin layer method. The plating layer becomes the father. There are dry and wet plating methods. Among wet plating methods, there are non-electrolytic plating and electrolytic plating. The dry method is called "vacuum layer deposition." Technologies for vacuum layer deposition include vacuum metallization, ion plating, sputtering, etc. Primary methods include dry plating and non-electrolytic plating. The secondary method is electrolytic plating. Plating may be carried out by a primary method or a secondary method.

The secondary method (electrolytic plating) is also called "electro-forming." Electrolytic plating can form a thick plating layer during a short time period. Prior to carrying out electrotype duplication, since the master substrate in not electrically conductive, a thin, generally about 50–100 nm, metal layer is formed upon the surface of the master substrate. This metal layer is called the "conductive layer." Formation of this conductive layer is called "metallization."

Metallization is generally carried out by a primary method. Although Ni (nickel) is the preferred metal, other suitable metals which may be used include, but are not limited to, Au, Pt, PD, Ag, Ti, TA, Cr, etc. It is also possible to use other highly conductive metals or metal compounds. It is also possible to use a metal that contains phosphorous. Particularly when Ni is used as the metal, it is possible to first form a primer layer consisting of another metal or a metal containing compound that has a thermal expansion coefficient nearly the same or equivalent to that of Ni itself. The conductive layer is formed upon this primer layer. During or after electrotype duplication, this primer layer can decrease the strain resulting from electrotype layer stresses. This strain phenomenon can sometimes destroy the pit and groove, etc., concavities. This primer layer may be removed after the father is completed.

Then the master substrate with the conductive layer is immersed in a plating solution in order to carry out electrotype treatment. Preferably, a nickel sulfamate solution is used as this plating solution. A Ni plating layer is formed upon the conductive layer as electrotype duplication is carried out. This Ni plating layer is the father (first metallic molding tool). It is also possible to use metals other than Ni. Alternatively, it is possible to mix other metals, i.e., Ti or elements, i.e., P with the Ni. Mixture with Ti results in a mold with a long working life due to relatively great hardness. Mixture with P can result in a mold with a great surface hardness. It is possible to obtain a hard father with a long working life by the use of a Ni—P, Ti—P, or Ni—Ti—P, etc. alloy composition for the conductive layer, plating layer, or both the conductive layer and plating layer. Moreover, it is possible, instead of a simple Ni plating layer, to add other plating layers, for example, metals such as silver, copper, or chrome, or alloys of such metals, to the Ni plating layer.

The first metallic molding tool (father) can also be manufactured by a primary method (dry plating or non-electrolytic plating) without the use of electrotype duplication. The dry method avoids the problem of waste water treatment. Among such dry methods, ion plating is capable of providing a mold that has particularly low surface roughness.

Concavities-protuberances of the master substrate disappear as the deposited plating layer thickness exceeds about 100 $\mu$m. That is to say, the plating layer surface appears flat. Generally, plating stops when the plating layer thickness reaches about 200 $\mu$m to about 600 $\mu$m thick, preferably, about 250 $\mu$m to about 300 $\mu$m. The father is then complete. Immediately after the first metallic molding tool (father) is completed, the father is still attached to the master substrate, so the father is then peeled away from the master substrate. This peeling must be carried out carefully since the father is a thin metal membrane. The father is then washed after peeling since resist, primer, and other contamination are possibly attached to the surface of the father. Washing treatment typically involves either (1) wet washing using organic solvent or purified water, or (2) dry washing such as ashing, plasma treatment, ultraviolet exposure, ozone cleaning, etc.

Some of the processes described so far are explained in Mieda et al. U.S. Pat. No. 5,673,250, column no. 11, line 56 through column no. 12, line 39 and FIG. 9, the disclosure of which is incorporated by reference herein in its' entirety.

Resin Molding Tool (Mother)

The mother is made in the manner described below. Soft resin is pressed against the concavity-protuberance surface of the father and the resin is hardened or cured. The hardened or cured resin is a copy of the concavities-protuberances of the father. The resin is then peeled away from the father to form a resin molding tool.

After production of a mother from a single father, the father can be used repeatedly many times. The present invention makes it possible to reuse the father over 10,000 times, whereas in the prior art, the father could be used 3 times at most. Another factor that distinguishes the present invention from the prior art is that multiple mothers manufactured from a single father, display no individuality. In other words, these mothers are identical clones. Therefore when the respective mothers are used for the production of respective metallic sons (second metallic molding tool), the resultant sons become identical clones of each other.

It is preferred that the resin provides superior duplication performance when pressed against the father. Resins with low viscosity or high fluidity generally have good duplication performance. Typical methods for lowering viscosity involve heating and softening the resin. In this case, the resin is subsequently cooled and hardened. Alternatively, the resin may be mixed with a solvent. In this case, the resin hardens after the solvent is volatilized. A preferred method employs a low viscosity material such as a low molecular weight resin, prepolymer, or resin raw material. Additionally, while not preferred, such a material can be a liquid. It is also possible to mix a solvent with these materials to further lower viscosity. In this case, a solid high molecular weight resin is formed as polymerization (curing) of the these materials occurs at the father surface. The produced resin reproduces the concavities-protuberances of the father. Polymerization of a low viscosity material may be performed by heating or radiation exposure. Alternatively, two resin liquids may be mixed together, and the resin mixture is allowed to simply react and polymerize. Ion beam radiation, electron beam radiation, ultraviolet radiation, far ultraviolet radiation, laser light, x-rays, synchrotron radiation, etc., are examples of the types of radiation which may be used. Ultraviolet radiation, however, is preferred due to ease of handling.

A preferred method of the invention involves backing the father with a flat substrate. Flatness of the father is poor due to its thinness, generally 250–300 $\mu$m. Therefore, the father may be backed by a highly flat substrate, such as metal or glass, which is approximately 1–20 mm thick. Examples of metals which can be used as the backing include iron, copper, brass, aluminum, stainless steel, bronze, etc. An adhesive may be used to attach the father to the substrate.

The father is placed with the concavity-protuberance surface facing upward while a low-viscosity ultraviolet-curing resin liquid is poured slowly from above. A transparent plate, such as a glass plate, may be placed upon the resin liquid so as to avoid the introduction of bubbles. Ultraviolet radiation may be applied through the transparent plate, thereby causing the resin to cure. The cured resin, together with the transparent plate, is peeled from the father. A mother is obtained in this manner that consists of two layers: cured resin and transparent plate.

A suitable transparent plate may be a glass plate of at least 0.6 mm thickness, preferably about 4 mm to about 10 mm thick. The glass plate should have a surface roughness that is low in comparison to the master substrate. A good surface roughness (Ra) value for the glass plate is 5 nm–1 µm. It is also possible to use resin materials, such as, polycarbonate, polystyrene, polyolefins, acrylic resins, etc., rather than glass plate.

When a glass plate is used, after first cleaning the plate, a primer, such as a silane coupling agent, may be used in order to improve adhesion between resin and glass plate. It is preferred that the primer is heated (baked) after it is applied.

Examples of silane coupling agents which may be used as the primer include, but are not limited to, vinyl silanes, acrylsilanes, epoxy silanes, aminosilanes, etc. Examples of vinyl silanes include, vinyltrichlorosilane, vinyltris(β-methoxy)silane, vinyltriethoxysilane, vinyltrimethoxysilane, etc. Examples of acrylsilanes include γ-methacryloxypropyltrimethoxysilane, etc. Examples of epoxy silanes include β-(3,4-epoxycyclohexyl) ethyltrimethoxysilane, γ-glycidoxypropyltrimethoxysilane, γ-glycidoxypropylmethyldiethyoxysilane, etc. Examples of aminosilanes include N-β-(aminoethyl)-γ-aminopropyltrimethoxysilane, N-β-(aminoethyl)-γ-aminopropylmethyldimethoxysilane, γ-aminopropyltriethoxysilane, N-phenyl-γ-aminopropyltrimethoxysilane, etc. Additional examples of silane coupling agents include γ-mercaptopropyltrimethoxysilane, γ-chloropropyltrimethoxysilane, etc.

Examples of other primers include, but are not limited to, silanes, such as, chlorosilanes and alkoxysilanes, silazanes, or special silylating agents. It is also possible to mix two or more of these primers. The primer can be used as a dilute solution in a solvent such as toluene, xylene, ethanol, methanol, isopropanol, etc.

Examples of the resin of the mother are listed below. Generally, the resins can be classified as either thermoplastic resins or thermosetting resins.

Examples of thermoplastic resins include, but are not limited to, polycarbonates, polystyrenes, styrene-type polymer alloys, polyolefins, polypropylenes, amorphous polyolefins, acrylate resins (such as polymethacrylates), polyvinylchlorides, thermoplastic polyurethanes, polyesters, nylons, etc.

Examples of thermosetting resins include, but are not limited to, thermosetting polyurethanes, epoxy resins, unsaturated acrylate resins, acrylurethane resins, unsaturated polyesters, diethyleneglycol-bis-allylcarbonate resins, etc. A preferred example is a curing resin solution mainly composed of urethanated poly(meth)acrylate, polycarbonate di(meth)acrylate, and acetal glycol diacrylate.

When a thermosetting resin is used, a low molecular weight resin liquid is made to contact the father. This resin solution can contain a curing catalyst or a curing agent. The curing catalyst is a photosensitizer when curing takes place due to ultraviolet radiation exposure. Typical examples of photosensitizers which may be used include acetophenones, benzoin alkyl ethers, propiophenones, ketones, anthraquinones, thioxanthones, etc. It is also possible to use various types of photosensitizers mixed together. In particular, 1-hydroxycyclohexyl phenyl ketone, etc. ketone-type photosensitizers are preferred due to their good duplication performance, mold releasability, and stability. Resins that cure upon exposure to ultraviolet light are called "ultraviolet curable resins" and are preferred for use as the resin of the mother. Indeed, it is preferred that the resin does not adhere to the father or son, particularly during peeling away from the mother.

In order to counter static electricity during the last electrotype duplication process or ion plating process, it is possible to mix an anti-static agent into the resin liquid. Alternatively, a thin anti-static layer (such as a Pt layer) is formed after the mother is completed. This type of anti-static treatment prevents problems such as burning, deformation, peeling, contaminant attachment, etc. An anti-static treatment might also be useful for further increasing uniformity of thickness of the mother.

Since the father is thin, it is preferable that the father is backed by a metal plate prior to peeling the mother away from the father. Preferably, the mother may then be readily peeled from the father. The skin of the peeled mother is generally not rough. When the father surface roughness Ra is less than 10 nm, the mother surface roughness Ra is typically less than 10 nm. When the father surface roughness Ra is less than 1 nm, the mother surface roughness Ra is typically less than 1 nm.

After peeling, the father can be used again for the production of a mother. Indeed, in Example 2, the father was used 1000 times and it may be possible to use the father more than 10,000 times. It is possible that this is due to construction of the mother from resin, which therefore avoids damage, particularly surface roughening, to the father during peeling. Due to the lack of damage, a mother produced after more than 10,000 copies is generally free of mother-to-mother individuality, or the individuality is extremely minor. Therefore these mothers may be considered to be clones. By the process of the invention, the mother can be produced more quickly and cheaply than the expensive father.

Second Metallic Molding Tool (Son)

Generally, the son has a metallic construction similar to that of the father. A son may be manufactured by plating the mother in the same manner as that described above for the manufacture of the first metallic molding tool (father). After the son is completely formed upon the mother, the son is peeled from the mother. The mother can be reused over 100 times after peeling.

In order to improve the flatness of the son, prior to peeling off the son, or after peeling off the son, the back surface of the son may be mechanically polished. When polishing is carried out after peeling, the concavity-protuberance surface of the son is given a protective coating in order to protect the son's concavity-protuberance surface. This protective coating is formed by applying a peelable protective coating, followed by drying.

Whatever the case, the son is peeled from the mother. The son is polished and a hole is mechanically drilled in the vicinity of the center. The outer perimeter of the son is removed in a similar manner. This results in a finished annulus-shaped son. Shipment of the son is then possible.

A preferred characteristic of the present invention is the low surface roughness of the son after peeling. Generally, when the mother surface roughness (Ra) is less than 10 nm, the son surface roughness (Ra) is also less than 10 nm and when the mother surface roughness (Ra) is less than 1 nm, the son surface roughness (Ra) is also generally less than 1 nm. As might be required, it is possible to manufacture a son that has a surface roughness (Ra) less than 0.5 nm, preferably less than 0.3 nm RMS (root mean square) roughness, where RMS is equal to the square root of $(Ra_1)^2+(Ra_2)^2$, $Ra_1$ being the roughness at a first point and $Ra_2$ the roughness at a second point. Additionally, it is preferred that the son has a surface waviness (Wa) less than or equal to 1 nm. Waviness (Wa) is the difference between a lowest point and a highest point within a 500 µm square area. Waviness may be measured by conventional means, such as with a TOPO-SYSTEM, manufactured by Wyco Corp. It is even possible, by the selection of more preferable conditions, to provide a son that has a surface roughness Ra less than 0.3 nm, preferably less than 0.1 nm RMS roughness.

Since the mother may be a clone, sons manufactured from a single father may also be clones. Thus, it is possible to describe the son as a clone of the father. A large number of low-cost sons may therefore be manufactured from the high-cost father.

Assuming that a million resin substrates are needed, approximately 50 sons are required. This number of sons is required since a single son becomes damaged and unusable after roughly 20,000–30,000 substrates. In previous methods, 50 sons would require 6 (=50÷9) fathers. This number is required since no more than 9 sons (related sons) are obtained from a single father. By the process of the invention, over 10,000 mothers are obtained from a single father. Therefore even if a single son is manufactured from a single mother, 10,000 sons (clone sons) may be obtained from a single father. Furthermore, when a master substrate II is produced using the RIE method, the resultant son has little surface roughness. Thus it is possible to manufacture a particularly high quality son.

Differentiation

Many of the sons are difficult to distinguish from one another. Therefore an identifying mark can be made upon the son at a certain location. For example, assuming that the son's signal recording region is between 22 mm and 59 mm radius, a location external to the signal recording region can be used (such as between 20 mm and 21 mm radius). Such a marking can simply consist of a groove, concavity, or pit. The mark can consist of indicia such as numbers or symbols. Preferred markings consist of an aggregate of fine concavities that appear to the eye as characters, letters, or numbers. Marking may be carried out by laser processing, stamping, or pressing. Marking may also be accomplished by utilizing a blade, sandpaper, polishing tape, etc.

When utilizing a blade, sandpaper, or polishing tape for marking, it is desirable to apply a protective film to the front surface and back surface of the son stamper beforehand, so that contamination and deformation of the front surface of the son stamper are prevented. This protective film application step may be performed before, during or after the inner and outer diameter processing step for the son stamper.

In addition to the method described above, the father, mother and son stampers can be marked using a laser. When a laser is used to perform the marking, it is desirable not to apply a protective film, so that letters or figures to be marked are clearly formed.

It is possible to mark a master substrate, father, or mother stamper in addition to the son stamper. Ideally, the master substrate should be marked so that it is clear which master substrate has been used to manufacture a son stamper. Because the performance of an optical disk made with a son stamper is especially impacted by the quality of the master substrate, being able to identify the master substrate is very useful from the standpoint of quality control for optical disks. Therefore, it is extremely important that a mark be used to identify the master substrate and the son stamper. Preferably, the father stamper and the mother stamper, in addition to the master substrate and son stamper, should have an identification mark. This is because the master substrate, the father substrate and the mother stamper deteriorate with each use.

Furthermore, manufacturing optical disks using a system in which the father stampers made using a common master bear a mark indicating the number of times the master substrate has been used, the mother stampers made using a common father stamper bear a mark indicating the number of times the father stamper has been used, and the son stampers made using a common mother bear a mark indicating the number of times the mother stamper has been used in this method is very useful from the standpoint of quality control for son stampers because the limit for using the master substrate, father and mother can be readily ascertained.

Figure 4:
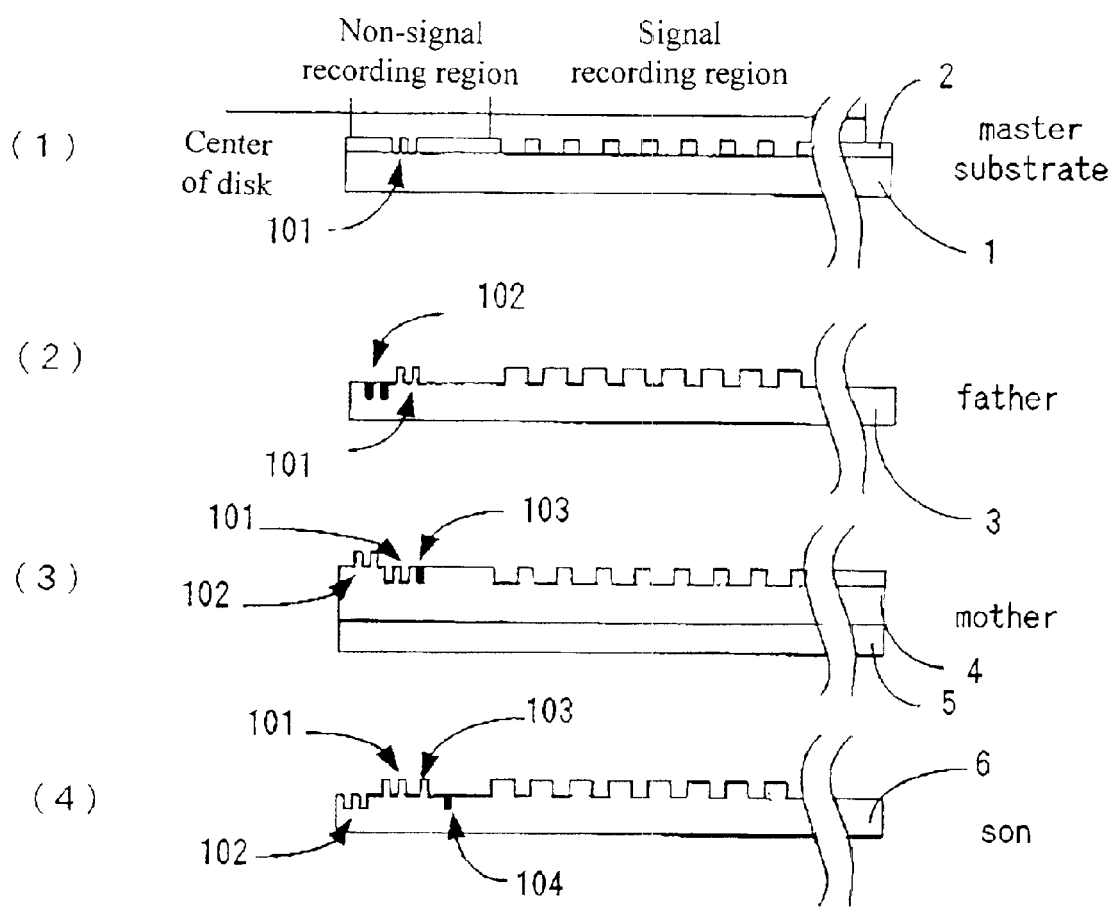
FIG. 4 shows a cross-section view of a master substrate, a father, a mother and a son stamper from the centerline outwards, depicting a concave/convex resist pattern.

The following is an explanation with reference to FIG. 4 of the manufacturing method of a son stamper where the master substrate, father, mother and son stamper are marked. FIG. 4 is a cross-sectional view of a master substrate, a father, a mother and a son stamper from the centerline outwards.

First, when the master substrate is manufactured, a photoresist is applied to the base as described above, and the laser beam of the laser beam recorder is used to perform exposure along the pits, grooves or other pattern. As described above, the laser beam recorder is also used in the non-signal recording region to expose the section corresponding to the pits and grooves along the mark indicating the master substrate. The laser beam recorder can be used to form a mark by inputting the required dummy pattern signals to form the mark.

When this is developed, the concave/convex resist pattern described above is formed as mark 101 shown in FIG. 4(1). FIG. 4(1) contains two sets of concave/convex patterns: one set in the signal recording region and one set in the non-signal recording region. In the signal recording region, the concave/convex pattern represents the shape of the pits and grooves in the signal recording area. In the non-signal recording area, the concave/convex pattern is the mark indicating the master substrate, illustrated in FIG. 4(1) as mark 101.

After the resist pattern has been hardened or cured using the method described above, a father is formed using the electrotyping method. After the father has been formed, a laser marker is used to form a mark indicating this father in the non-signal recording region of the father. The mark indicating the master substrate is illustrated as mark 101 on FIG. 4(2) and the mark indicating the father stamper is illustrated as mark 102 on FIG. 4(2).

When a mother is duplicated using this father as described above, a mark indicating the master substrate and a mark indicating the father are formed on the mother. A mark indicating this mother is formed in the non-signal recording region of this mother using a well-known method. The mark indicating the master substrate is illustrated as mark 101 on FIG. 4(3), the mark indicating the father stamper is illustrated as mark 102 on FIG. 4(3), and the mark indicating the mother stamper is illustrated as mark 103 on FIG. 4(3).

Furthermore, when a son stamper is formed as described above, a mark indicating the master substrate, a mark indicating the father, and a mark indicating the mother are formed in the non-signal recording region of the son stamper. In addition, by forming a mark indicating this son in the non-signal recording region of the son stamper using a laser marker, marks indicating the master substrate, the father, the mother and the son stamper are formed in the non-signal recording region of the son stamper. The mark indicating the master substrate is illustrated as mark 101 on FIG. 4(4), the mark indicating the father stamper is illustrated as mark 102 on FIG. 4(4), the mark indicating the mother stamper is illustrated as mark 103 on FIG. 4(4), and the mark indicating the son stamper is illustrated as mark 104 on FIG. 4(4).

As shown in FIG. 4, the pattern of the mark as exposed on the master substrate is formed in the same shape on the mother, whereas the reversed shape of the pattern of the mark formed on the master substrate is formed on the father and the son. Therefore, when the mark is formed by a collection of concave sections on the master substrate, the mark is formed by a collection of convex sections on the son. When a new mark is to be formed on a son stamper, the mark is formed by a collection of convex sections as though the mark were formed on the master substrate. In this way, the mark indicating the master substrate and the mark indicating the son can be differentiated.

Therefore, when the stampers are manufactured in successive order from master substrate, to father stamper, mother stamper and son stamper, a mark formed by cutting or boring into the master substrate has a convex shape when formed on the son stamper. Accordingly, if a mark is formed in a son stamper by cutting or boring in a similar manner when formed on the master substrate, it can be determined which mold was used by examination of the resin substrate since such markings are copied to the resin substrate.

This is illustrated by comparing FIG. 4(1) with FIG. 4(4). As discussed above, mark 101 in FIG. 4(1) depicts a concave shape on the master substrate, and the same mark 101 in FIG. 4(4) depicts a convex shape on the son stamper, indicating the son stamper was formed from the master substrate. The son stamper additionally exhibits newly formed mark 104, a mark which is different from mark 101. Therefore, since the mark indicating a master substrate on the son stamper (mark 101) is different from the mark indicating the son stamper (mark 104), the master substrate and the son stamper are readily distinguishable.

The marking of the master substrate can also be differentiated from that of the son stamper by changing the type of mark formed on the master substrate and the son stamper. For example, the type of mark can be changed by changing the font of the letters or numbers used.

By changing the type of mark and changing the shape from concave to convex, the difference can be readily identified both by sight and by feel. These markings can be used for quality control.

Molding of the Resin Substrate

The son can be used for manufacturing (molding) a resin substrate by copying concavities-protuberances from the surface of the son. Suitable molding methods include, but are not limited to, injection, pressing, casting, etc. The injection molding method has the highest productivity among such molding methods.

The resin used for the resin substrate is generally a thermoplastic resin, particularly a relatively hard resin. Examples of such resins include, but are not limited to, polycarbonates, polystyrenes, styrene-type polymer alloys, acrylate resins (such as polymethacrylates), polyvinylchlorides, polyesters, nylons, ethylene-vinylacetate resins, amorphous polyolefins, etc. However, as might be required, it is also possible to use a thermosetting resin. Examples of such thermosetting resins include epoxy resins, thermosetting polyurethanes, unsaturated acrylate resins, unsaturated polyesters, diethyleneglycol-bis-allylcarbonate resins, etc. The resin substrate may be molded by conventional methods used in the art.

By the process of the invention, a large number of sons (second metallic molding tool) may be manufactured from a single master substrate. Furthermore, these sons typically have low surface roughness. The surface roughness of the sons is identical or nearly identical to that of the master substrate. In contrast, previous methods produced son surface roughness which was degraded relative to that of the master substrate. Therefore the use of the son of the invention makes possible the manufacture of a high quality resin substrate, such as an optical disk. Quality evaluation factors include wobble format signal noise, irregularities, jitter, error rate, crosstalk, clock stability, and fine clock mark quality. Therefore the son of the present invention can be used with advantage for molding a resin substrate (optical disk) that has a wobble signal, such as a CD-R, CD-RW, MD, DVD-ROM, DVD-R, DVD-RAM, DVD-RW, etc.

The multiple sons manufactured by the process of the invention preferably have so little individuality as to be capable of being called "clones." Therefore when the son is set within an injection molding machine, and when a resin substrate is molded, it is preferred that there is little or no need for adjustment of molding conditions from son-to-son. Such molding conditions include metallic mold temperature, resin temperature, injection pressure, cycle time, etc. In contrast, in previous methods, if the molding conditions were not altered, resin substrates were not obtained with identical copy morphology, tilt, birefringence, etc. However, such adjustments of the molding conditions are very complicated, and are disliked by those in the molding industry. In contrast, use of a plurality of sons of the present invention typically reduces or avoids such complications.

Even when injection conditions are carefully adjusted, the molded resin substrate can have a pattern that is called "haze" by those in the industry. This haze pattern results in a loss of specular reflection within the region of the haze pattern, spoiling the visual appearance of the resin substrate. In addition, such a resin substrate could be considered to be a defective product since the requirement for high precision is not met. Preferably a son of the present invention does not generate haze.

In previous methods, foreign bodies, such as particles, frequently became attached to the son after the son was peeled from the Ni mother. Such foreign bodies did not readily wash off. It is possible that such foreign bodies resulted from the passivation that was used in order to readily peel the son from the Ni mother. Indeed, remnant potassium dichromate or potassium permanganate used during passivation occurs on the Ni mother surface. These substances may react with the son and to attach to the son. This probably also occurs during copying of a Ni mother from a Ni father. Although it is unclear whether this surmised origin of such foreign bodies is correct, the prior art results in a rough surface for the mother and father.

In the present invention, as passivation is not required, foreign bodies generally do not attach to the mother and father. Therefore, the father, mother, and son may be readily cleaned.

Although the present invention was explained in detail by the application of the resin substrate as an optical disk, it is also possible for the resin substrate to be used for other applications. The son of the resent invention can be used to mold any kind of resin substrate that has minute concavities-protuberances. Such resin substrates can be used as substrates for applications such as magnetic disks (hard disks), optical cards, liquid crystal display devices, semiconductor devices, printer components, data write-rewrite devices, personal computer components, automotive components, etc. Such resin substrates can be used as optical components (such as zone plates, aspheric lenses, refraction gratings, holograms, photomasks, or reticles) or encoder components. Preferably, the resin substrate is a data storage disk or an optical disk.

EXAMPLES

Example 1

Figure 1:
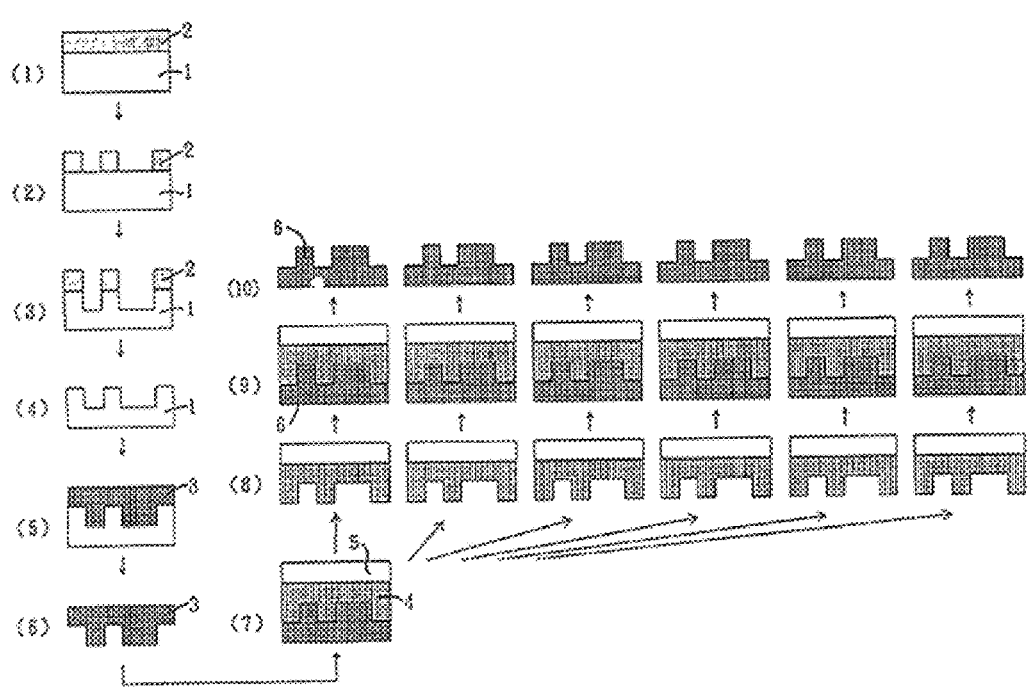
FIG. 1 is a process flow diagram of a process of manufacturing master substrate II of the invention.

An embodiment is explained while referring to FIG. 1.

First, two synthetic quartz plates were prepared as substrate materials. These plates were each processed so as to have an annular shape with 185 mm outside diameter, 20 mm inside diameter, and 6 mm thickness. These processed substrates became substrate (1). Then the respective substrate surfaces underwent precision polishing so as to have a surface roughness Ra less than 1 nm. After washing, first primer (hexamethyldisilane) and then photoresist was then applied by spin coating the substrate surface. The substrates then underwent pre-bake, resulting in a roughly 200 nm thick photoresist layer (2) upon the respective substrates (1). The substrate (1) upon which the photoresist (2) was formed is indicated in FIG. 1 by item (1).

Then a laser cutting machine was used to expose the photoresist upon the no. 1 substrate. This exposure pattern consisted of, according to the re-writeable MD (mini-disc) format, a wobble guide groove pattern and prepits that become the TOC (table of contents) pattern. The track pitch was 1.6 µm, the groove width was 1.2 µm, the groove wobble amplitude was about 30–40 nm, and the TOC pattern prepit width was about 0.4 µm.

The photoresist of the no. 2 substrate was exposed with a different pattern. This corresponded to that of the 4.7 Gbyte/side DVD-RAM format: (a) a single spiral land/groove pattern and (b) a pattern of address pits. The track pitch was 0.58 µm (the groove pitch was 1.16 µm, twice the groove pitch, as per the "land/groove" recording format). Groove width was about 0.58 µm. Pit width of the address region was about 0.3 µm. Wobble amplitude was about 10–20 nm.

After the completion of exposure of the resist upon the two substrates, each respective substrate was developed using an inorganic alkaline developing solution. The resist surface was spin cleaned, followed by a 30 minute long post-bake at 120° C., resulting in formation of resist pattern (2). This is indicated by item (2) within FIG. 1.

The substrates were loaded into a reactive ion etching (RIE) apparatus, and dry etching was carried out. This is indicated by item (3) within FIG. 1.

Remnant resist was removed, and the substrates were cleaned, resulting in master substrate II. These patterns were directly etched upon the quartz substrates of these master substrates II. This is indicated by item (4) within FIG. 1.

The pit and groove depth of the no. 1 master substrate II (MD format) was about 65 nm. The pit and groove depth of the no. 2 master substrate II (DVD-RAM format) was about 140 nm.

Since these master substrates II were manufactured using the RIE process, the groove sidewalls, the pit sidewalls, and the pit front and rear edges were all extremely sharp. This imparts the following (a)–(e) advantages to an optical disk: (a) The wobble signal is accurately reproduced; (b) CNR improves; (c) Cross-erasure and crosstalk are reduced; (d) Dropout of the various read-write signals in extremely low; and (e) Noise also is greatly reduced since the roughness of the pit bottoms, pit sidewalls, groove bottoms, and groove sidewalls is extremely low.

First Metallic Molding Tool (Father)

The no. 1 master substrate II was placed within a sputtering apparatus, and a Ni layer (conductive layer) of roughly 50–70 nm thickness was deposited upon the surface. When the master substrate II concavities-protuberances are deep, sputtering is preferably carried out in a RF discharge. A RF discharge is affected adversely (for example, causing sputtering rate inhomogeneity) by static electricity upon master substrate II. Sputtering was carried out in an RF discharge (electric power=400 W). The same type of conductive layer was deposited upon the other master substrate II.

When the Ni layer is thick, the Ni plating layer sometimes subsequently peels off. In such instances, the Ni layer (conductive layer) thickness is then reduced by 10 nm–40 nm.

The no. 1 master substrate II was next placed in a plating solution into which nickel sulfamate had been dissolved. The solution temperature was about 45–55° C. Then electricity was turned on and Ni electrotype duplication started. The current density was low at the beginning. Current density was then gradually increased. Electrotype duplication was halted when the resultant Ni plating layer (3) thickness reached 293 µm.

A Ni plating layer (3) was formed upon the no. 2 master substrate II in the same manner. The father mainly consisted of this plated object (3). This is indicated by item (5) of FIG. 1.

Each father was peeled off of the respective master substrate II. The peeled father is shown in FIG. 1 as item (6). Surface roughness (Ra) of the fathers was less than 1 nm.

Spin coating was used to apply a protective coating (commercial product name=Clean Coat-S, manufactured by Fine Chemical Japan Inc.) upon the father's concavity-protuberance surface. After coating, the coating was allowed to dry naturally for about 10 hours, thereby shielding the concavity-protuberance surface with a protective coating. After polishing of the backside surface of the father, the inner diameter and outside perimeter were removed, thereby completing the manufacture of two annulus-shaped fathers. Completion of each of the fathers required about 13 hours.

Master substrate II was not damaged after the father was peeled away. Therefore after washing of the each master substrate II, this same process was carried out, and respective 2nd fathers were each produced. In this manner, a total of 4 (=2×2) fathers were obtained.

Epoxy adhesive was used to attach the father backside surface to a stainless steel plate. The flatness of the father was improved by this means.

Resin Molding Tool (Mother)

An ultraviolet-curing resin solution was prepared. This resin solution was prepared by mixing together (1) 70 parts of acetal glycol diacrylate having the following Structural Formula 1:

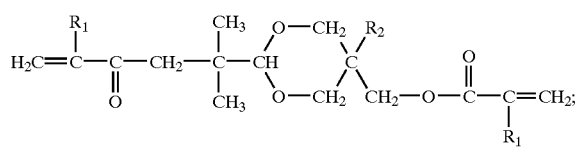

(I)

$R_1$ = H or $CH_3$
$R_2$ = $CH_3$ or $C_2H_5$ (2) 30 parts urethane acrylate, which is a mixture of compounds having the following Structural Formula 2 and Structural Formula 3:

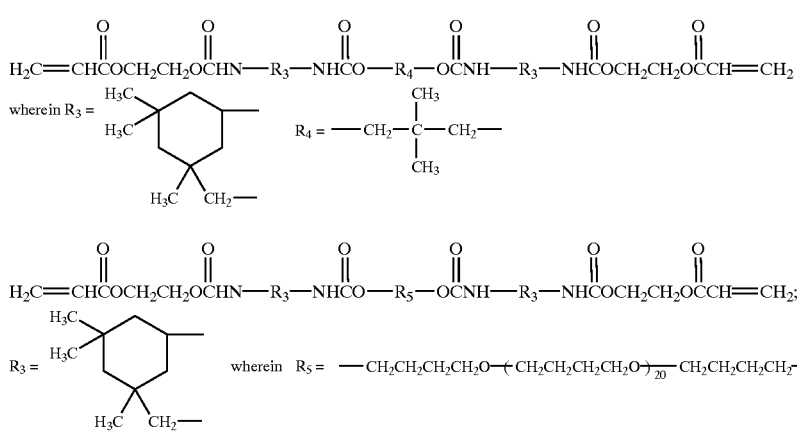

and (3) 3 parts of 1-hydroxycyclohexyl phenyl ketone (commercial product name=IRGACURE 184, manufactured by Ciba-Geigy Corp.).

When the desired properties of the resin solution are considered (heat and light absorption characteristics, mold releasability, light-resistance, durability, hardness), the preferred resin solution has a color number (APHA) of 30–50 and a refractive index of 1.4–1.8 at 25° C. For this embodiment, a refractive index of 1.47–1.48 was used with a color number of 40, in consideration of mold releasability and the numerous electrotype duplications.

From the standpoint of duplication performance, the resin solution preferred properties include a specific gravity at 25° C. of 0.8–1.3 and a viscosity at 25° C. of 10–480 CPS. For the present embodiment, with the goals of shortening the mother production time and of lessening bubble entrapment, a resin solution was used that had a specific gravity of 1.08 and 4500–4780 cps viscosity.

It is possible to use a low molecular weight fraction to attain this viscosity. In other words, since the molecular weight of the urethane acrylate (Chemical Structural Formula 2 and Chemical Structural Formula 3) was as large as 1,000–2,000, it was possible to lower viscosity by the use of a lower molecular weight fraction.

A green glass disk was prepared separately. This green glass disk had 200 mm outside diameter, 10 mm inside diameter, and 6 mm thickness. The disk was washed, and the surface was coated with silane coupling agent (primer). The silane coupling agent consisted of a 2% solution of γ-methacryloxypropyltrimethoxysilane dissolved in solvent (toluene). Coating was carried out by the spin shower method. A 120° C. bake was carried out after coating.

The father was placed with the concavity-protuberance surface upward, and resin solution was slowly poured upon the father. The resin solution was poured carefully to avoid bubble entrapment. Then glass plate (5) was pressed against the father so that the viscous resin solution was spread uniformly across the entire surface of the father.

The resin solution was exposed through the glass plate to ultraviolet radiation from a mercury lamp. The resin solution was cured by this means, resulting in the production of cured resin layer (4). The two-layer composite mother then consisted of resin layer (4) and glass plate (5). This is indicated as item (7) in FIG. 1.

Next, the mother was peeled away from the father. This was carried out with considerable care so as to avoid damaging the mother or father. The other 3 fathers were treated in the same manner, thereby producing respective mothers. The surface roughness (Ra) of each mother was less than 1 nm.

The father could be used repeatedly after peeling due to the absence of damage. Surprisingly, resin did not attach to the father, so remnant resin removal was unnecessary. Therefore the father was used again without additional treatment for the manufacture of another mother. The father was used 1000 times. As a result, 2000 (=2×1000, or a total of 4000 for both types of master substrates II) mothers were produced from a single master substrate II. This is indicated in FIG. 1 as item (8). The mother production time was short, requiring 15–60 minutes to produce a single mother.

Second Metallic Molding Tool (Son)

A respective son was manufactured from each mother. The son manufacturing method was identical to the above-described father manufacturing method. However, the mother was used in place of master substrate II. As shown in item (9) of FIG. 1, the son (6) was still attached to the mother immediately after production of the son. After the son is peeled from the mother, a free son (6) is obtained as indicated by item (10) of FIG. 1.

After the application of a protective coating to the concavity-protuberance surface of the son, the backside was polished, resulting in a son with uniform thickness. Then the son inside diameter and outside perimeter were cut away, completing the Ni son. Son thickness was 293 μm. The son surface roughness (Ra) and waviness (Wa) were both less than 1 nm.

After the son was peeled from the mother, the mother was undamaged so it was possible to use the mother repeatedly over 100 times. Surprisingly, resin did not attach to the mother, so remnant resin removal was unnecessary. Repeated use of the mother, however, was stopped at this point.

Since a single son each was produced from each mother, 2000 sons were obtained from 1 type of mother, and a total of 4000 sons were obtained from both types of mothers.

These fathers, and the sons of these fathers, were set in turn within specialized signal reproduction equipment, and the reproduced signals were checked. Signal types included tracking signals, noise, wobble signals, address signals, and the defect count. It was found that reproduction signal quality was substantially equivalent to that of the father. Furthermore, the reproduction signal from the 2000th son was substantially equivalent to that of the other sons.

Per the prior art, 2000 to 223 (223=2000÷3÷3) master substrates II were required in order to manufacture 2000 sons of a single type. The prior art son was expensive due to the extremely high cost of the master substrate II. In contrast, inexpensive sons were produced from a single expensive master substrate II during this embodiment.

Respective 2000 sons of a single type were each set in an injection molding machine, and test resin substrates were molded. It was possible to carry out molding without alteration of molding conditions. It is therefore possible to refer to the 2000 sons of a single type as clones without individual differences occurring between the sons.

Example 2

Figure 2:
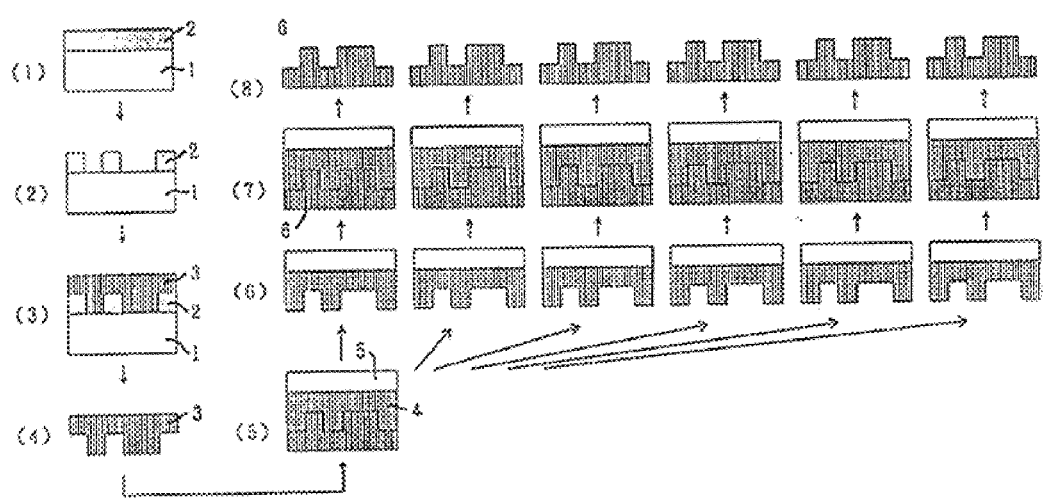
FIG. 2 is a process flow diagram of a process of manufacturing master substrate I of the invention.

This embodiment is explained while referring to FIG. 2.

Master Substrate I

First, two green glass plates were prepared as substrate materials. These plates were each processed so as to have an annular shape with 200 mm outside diameter, 10 mm inside diameter, and 6 mm thickness. The processed substrate became substrate (1). Then the respective substrate surfaces underwent precision polishing so as to have a surface roughness (Ra) less than 1 nm. After washing, first primer (hexamethyldisilane) and then photoresist were applied by spin coating to the substrate surface. The substrates then underwent pre-bake, resulting in a roughly 70 nm thick photoresist layer (2) upon the (MD application) no. 1 substrate (1) and a roughly 145 nm thick photoresist layer (2) upon the (DVD application) no. 2 substrate (1). The substrate (1) upon which the photoresist (2) was formed is indicated in FIG. 2 by item (1).

A laser cutting machine was then used to expose the photoresist. The no. 1 substrate exposure pattern was the same MD format used for the no. 1 substrate of example 1. Furthermore, the no. 2 substrate exposure pattern was the same DVD-RAM format used for the no. 2 substrate of example 1.

After the completion of exposure, the resist upon the two substrates was developed in the same manner as example 1. This resulted in formation of the resist pattern (master substrate I) indicated by item (2) within FIG. 2. The resist pattern becomes somewhat thinner during exposure, resulting in a roughly 65 nm thick photoresist layer upon the no. 1 substrate (MD application) and a roughly 140 nm thick photoresist layer upon the no. 2 substrate (DVD application).

Here a photoresist material was used with an over 95% photoresist material yield rate, so the groove sidewalls, pit sidewalls, and pit top and bottom edges were all sharply formed. This resulted in precise reproduction of the wobble signal. Furthermore, this led to improved CNR, lower crosserase, and decreased crosstalk. There was little dropout of the write signal and the read signal. Noise was low since surface roughness was low for the groove bottom and sidewalls, as well as for the pit bottom and sidewalls.

First Metallic Molding Tool (Father)

Master substrate I was used in place of master substrate II, and a father (item (3) of FIG. 2) was manufactured in the same manner as the father of example 1.

After father (3) was peeled from master substrate I (see item (4) of FIG. 2), remnant resist was washed from the surface using acetone, etc. organic solvent. The concavity-protuberance surface of the father was then spin coated with Silitecto, a product manufactured by Ace Industrials Co. After being protected in this manner, the father then underwent backside polishing. The father was trimmed in order to adjust the shape of the father, resulting in an annular shape with 16 mm inside diameter and 170 mm outside diameter. The father was 293 µm thick.

A total of two fathers (no. 1 and no. 2) were obtained since there were 2 types of master substrates I.

In the same manner as example 1, epoxy adhesive was used to attach each father backside surface to a respective stainless plate.

Resin Molding Tool (Mother)

In the same manner as example 1, a resin mother was manufactured (copied) from the father. The father was undamaged after the mother was peeled away. Surprisingly, resin did not attach to the father, so remnant resin removal was unnecessary. Therefore the father was used repeatedly without additional treatment. 1000 mothers were manufactured from a single father. This is indicated by items (5) and (6) of FIG. 2. It is anticipated at these 1000 mothers have entirely identical concavity-protuberance signals.

1000 mothers were also copied in the same manner from the no. 2 father which had different concavity-protuberance signals. It is anticipated that these 1000 mothers have entirely identical concavity-protuberance signals.

Second Metallic Molding Tool (Son)

Ni sons were manufactured from the resin mother in the same manner as embodiment 1. The thickness of the Ni son was 293 µm. The son surface roughness (Ra) and waviness (Wa) were both less than 1 nm.

After the son was peeled from the mother, the mother was undamaged. Surprisingly, resin did not attach to the mother, so remnant resin removal was unnecessary. Therefore the mother was used repeatedly without remnant resin removal. The mother was used 10 times, resulting in the production of 10 Ni sons. This is indicated by items (7) and (8) of FIG. 2.

From each of the 1000 no. 1 mothers (MD format), 10 respective Ni sons were manufactured. Therefore a total of 10,000 (=10×1000) sons were obtained. These 10,000 sons had entirely identical concavity-protuberance signals. These sons had no individuality. Therefore these 10,000 sons can be described as clones.

The no. 2 mothers (DVD-RAM format) had a signal pattern different from that of the no. 1 mothers. From each of the 1000 no. 2 mothers, 10 respective Ni sons were manufactured. Therefore a total of 10,000 (=10×1000) sons were obtained. These 10,000 sons had entirely identical concavity-protuberance signals. These sons had no individuality. Therefore these 10,000 sons can be described as clones.

These fathers, and the sons of these fathers, were set in turn within specialized signal reproduction equipment, and the reproduced signals were checked. Signal types included tracking signals, noise, wobble signals, address signals, and the defect count. It was found that son reproduction signal quality was equivalent to that of the father. Furthermore, the reproduction signal from the 10,000th son was equivalent to that of the other sons.

The 10,000 sons of a single type were each set in an injection molding machine, and test resin substrates were molded. It was possible to carry out molding without alteration of molding conditions. It is therefore possible to refer to the 10,000 sons of a single type as clones without individuality.

Example 3

A Sumitomo Heavy Industries, Ltd. model SD30 injection molding machine was used for injection molding.

Polycarbonate (manufactured by Teijin Co., Ltd., product name=AD5503) was used as the resin of the resin substrate. This resin was loaded for feeding to the above-mentioned injection molding machine.

From among the 10,000 second metallic molding tools (sons) manufactured during embodiment 2 (DVD-RAM format), 10 sons (referred to as no. 1 son through no. 10 son) were selected at random. The no. 1 son was set in the above-mentioned molding machine. Resin substrate molding was carried out under the following conditions: 125° C. metal mold temperature, 340° C. resin temperature, 30 metric ton injection pressure, and 12 seconds cycle time. The substrate thickness was 0.6 mm. 600 resin substrates (DVD-RAM format) were manufactured during 2 hours.

The no. 1 son was removed from the above-mention molding machine. The no. 2 son was then set in the above-mentioned molding machine, and 600 resin substrates were manufactured in the same manner. During this manufacturing process, molding conditions remained unaltered despite the use of a different son. Then in the same manner, resin substrates were manufactured using the no. 3 through no. 10 sons. A total of 6,000 (=600×10) resin substrates were finally obtained.

Two sons were selected at random from among the resin substrates molded from each respective son. In other words, a total of 20 (=2×10) sons were selected. Then groove morphology and pit morphology of these 20 resin substrates were observed using an electron microscope (HR-SEM) and an atomic force microscope (AFM). Four morphology categories were used here: top width, bottom width, depth, and sidewall slope. As a result of these observations, it was judged that each of the 20 resin substrates had identical groove morphology and pit morphology. Furthermore, the tilt (or warp) and the birefringence of these resin substrates were measured. Tilt for each of these substrates was within ±0.3 degrees. The birefringence of each substrate was within 50 nm. None of the substrates had haze.

Comparative Example

Ten master substrates II (DVD-RAM format) were manufactured in the same manner as example 2. Manufacturing conditions were entirely unchanged.

Ten fathers were manufactured from each master substrate I in the same manner as example 2. Manufacturing conditions again were entirely unchanged.

The resultant ten fathers were trimmed to the identical outside diameter and inside diameter as example 2. Based upon prior experience, these ten fathers had individuality.

The ten trimmed fathers were used in place of sons, and the example 3 procedure was repeated. 600 resin substrates were molded without altering the molding conditions despite changes in fathers. 600 resin substrates were selected at random from among the resultant resin substrates. The tilt and birefringence were measured for these selected resin substrates. The yield rate of good product resin substrates was 40%, where good products were those judged to have a tilt within ±0.3 degrees. The yield rate of good product resin substrates was 50%, where good products are those with a birefringence within 50 nm. 20% of the products passed as determined by both the tilt and birefringence.

Therefore, resin substrates were molded using various molding conditions. Trial-and-error adjustments were repeated until conditions were found for a 100% yield rate. Six hours were required to discover such conditions. However, 5% of the substrates had haze. Substrates with haze were discarded as defective. From among the good (without haze) resin substrates molded from each father, 2 resin substrates were selected at random. The groove morphology and pit morphology of these selected resin substrates were observed using an electron microscope (HR-SEM) and an atomic force microscope (AFM).

As a result of these observations, it was found that among these resin substrates there was no single set of resin substrates with identical groove morphology and identical pit morphology. Furthermore, since molding conditions varied, it was not surprising to find that some substrates had land edges that were rounded and that some land tips had small projections.

What is claimed is:

1. A method of manufacturing a mold tool for molding the base of an optical disk having at least one signal recording region and at least one non-signal recording region comprising:

(a) providing a master substrate comprising a signal recording section having a surface with at least one minute concave section or convex section and a non-signal recording section having a surface with at least one concave section or convex section forming a mark indicating the master substrate;

(b) forming a first nickel or nickel-alloy mold on said master substrate;

(c) peeling off said master substrate from said first mold;

(d) forming a resin layer in said first mold;

(e) hardening said resin layer to form a cured resin mold;

(f) peeling off said first mold from said cured resin mold:

(g) forming a second nickel or nickel-alloy mold on said cured resin mold;

(h) peeling off said second mold from said resin mold;

(i) marking said non-signal recording region of said second mold indicating said second mold;

wherein said second mold has a signal recording section comprising a surface having at least one minute concave section or convex section, and a non-signal recording section comprising a surface having at least one concave section or convex section forming a mark indicating said master substrate and at least one concave section or convex section forming a mark indicating the said second mold.

2. The method of claim 1, wherein the master substrate is prepared by a method comprising:

(a) coating the surface of the base of said master substrate with a photoresist;

(b) exposing said photoresist so as to form a predetermined pattern of pits and/or grooves in the signal recording region, and concave sections or convex sections forming a predetermined mark in the non-signal recording region; and (c) developing said exposed photoresist to form a resist pattern on the base of said master substrate.

3. The method of claim 1, wherein the concave sections or convex sections are formed using a laser.

4. The method of claim 1, wherein the first nickel or nickel-alloy mold is formed on said master substrate using electrotype duplication.

5. The method of claim 1, wherein the second nickel or nickel-alloy mold is formed on said cured resin mold using electrotype duplication.

6. The method of claim 1, wherein the type of mark formed on the master substrate indicating said master substrate comprises a type of mark different from the type of mark formed on the second mold indicating said second mold.

7. The method of claim 1, further comprising the steps of:

(j) repeating the steps (d) through (f), such that more than one resin mold tool is formed from the same first mold tool, and (k) repeating steps (g) through (i) using the resin mold tools formed in step (j), such that more than one second mold tool is formed and wherein the signal recording region of the second mold is cloned but the marks formed in the non-signal recording region of the second mold are different from each other.

8. A method for manufacturing a molded base of an optical disk comprising:

(a) providing the mold tool prepared by the method of claim 1, and (b) molding raw material with said second mold tool.

9. A method of manufacturing a mold tool for molding a substrate comprising:

(a) providing a master substrate having a signal recording section comprising a surface having at least one minute concave section or convex section and a non-signal recording section comprising a surface having at least one concave section or convex section forming a mark indicating the master substrate;

(b) duplicating said master substrate and forming a mold tool; and (c) forming a concave section or convex section in the non-signal recording section of said mold tool which forms a mark indicating said mold tool;

wherein a resist is applied to the base of the master substrate and exposed using a laser cutting device to form the mark indicating the master substrate in the non-signal recording section of said master substrate, and wherein the mark indicating the mold tool is formed using a laser marker.

10. A method for manufacturing a molded substrate comprising:

(a) providing the mold tool prepared by the method of claim 9, and (b) molding raw material with said second mold tool to form a molded substrate.

11. The method of claim 10, wherein the molded substrate comprises a data storage disk or an optical disk.

* * * * *

UNITED STATES PATENT AND TRADEMARK OFFICE
CERTIFICATE OF CORRECTION

PATENT NO. : 6,814,897 B2  Page 1 of 1
APPLICATION NO. : 09/729317
DATED : November 9, 2004
INVENTOR(S) : Seiji Morita It is certified that error appears in the above-identified patent and that said Letters Patent is hereby corrected as shown below:

On Title Page

Item (73) Assignee: delete "Discovision Associates" and insert therefor -- Research Investment Network, Inc. -- before Irvine, CA (US)

Signed and Sealed this

Nineteenth Day of February, 2008

JON W. DUDAS
*Director of the United States Patent and Trademark Office*